Patented July 25, 1933

1,919,714

UNITED STATES PATENT OFFICE

HERBERT A. ENDRES, OF CUYAHOGA FALLS, OHIO, ASSIGNOR TO THE B. F. GOODRICH COMPANY, OF NEW YORK, N. Y., A CORPORATION OF NEW YORK

METHOD FOR PREPARING INSOLUBLE PIGMENTS

No Drawing. Application filed January 8, 1929. Serial No. 331,159.

This invention relates to the art of preparing finely divided pigments such as are used as reenforcing agents or fillers in rubber compositions, and particularly to a method for preparing finely divided barium sulphate which may readily be incorporated into rubber, oils, etc.

Heretofore barium sulphate has found an extensive use as a pigment, because of its cheapness and extraordinary inertness. However, the naturally occurring barium sulphate, commonly known as the mineral "barytes", is frequently somewhat discolored by traces of iron and is very hard, and difficult to grind to the degree of fineness which is desired in rubber or paint pigments. The precipitated barium sulphate, known as "blanc fixe", can be prepared with a smaller particle size than ground barytes, but the practical limit of particle size has been found to be about 4 microns, that is, 0.004 mm. in diameter. Ordinary precipitated barium sulphate which contains a large proportion of particles finer than 4 microns cakes on drying, and cannot again be reduced to its original very fine degree of subdivision. Attempts to produce an exceptionally fine product have usually resulted in a material comprising aggregates much larger than the coarse crystals found in the normal product.

This invention, in brief, comprises precipitating barium sulphate or other insoluble inorganic pigments in an extremely finely divided form, adding a small proportion of a soap, and washing, and drying the precipitate. The precipitation of barium sulphate, for example, may be performed by mixing a solution of a barium compound with a solution of sulphuric acid or any soluble sulphate. The barium sulphate is immediately precipitated in a finely divided state. From ½ to 2% of a soluble soap is mixed with the wet product, which is then washed substantially free of soluble salts, and dried.

Apparently the beneficial effects secured by the practice of this invention must be ascribed to a specific action of the soaps. Other colloids cannot well be substituted therefor because they do not form a like soluble protective layer around the individual particles. For example, if gelatine were added to the washed suspension of barium sulphate before drying, the gelatine would glue the particles together, the dried cake would be exceedingly hard and could not be broken up and dispersed in rubber, oil, etc., but could only be broken into gross aggregates which would impart entirely different properties to the dispersion than if the individual minute particles were entirely separate one from another and uniformly dispersed.

The present invention is applicable to any pigment which may be precipitated from solution in a very finely divided form. The more insoluble the pigment is, the easier it is to obtain very small and uniform particles. Such compounds as magnesium carbonate, calcium carbonate, lead chromate, zinc sulphide, calcium oxalate, and barium sulphate are therefore especially adapted to the treatment by the method of this invention. This method will be specifically described with reference to barium sulphate, but it will be understood by those skilled in the art that by substituting other raw materials and making other obvious changes in the various steps of the method, other fine pigments exhibiting the advantages attained by the practice of this invention may be prepared.

Preferably the precipitation of the barium sulphate is performed under such conditions that the average diameter of the particles is considerably under 0.5 microns. This is most readily accomplished by mixing concentrated solutions of a barium salt and a sulphate to form a barium sulphate gel. The gel can then be caused to crystallize in extremely minute crystals by agitating it violently. The barium salt may be barium sulphide, barium thiocyanate, barium nitrate, barium chloride, bromide or iodide, most of the other salts, in general, possessing too low a solubility. The sulphate is preferably sodium sulphate, but sulphuric acid, or any other soluble sulphate, such as ammonium sulphate, sodium aluminum sulphate (common alum), cadmium sulphate, zinc sulphate, ferric sulphate, manganese sulphate, etc. may be substituted therefor. If a sulphate of zinc, cadmium, copper, iron, nickel, tin, or manganese is employed together with barium sulphide, the corresponding lithopone will be formed. In general, however, it will be found more satisfactory to precipitate the barium sulphate alone by the reaction of barium chloride with sodium sulphate. The barium chloride may be the technical grade salt. The sodium sulphate may be the hydrated crystalline sulphate sold under the name of "Glauber's salt", or may be sodium bisulphate neutralized with sodium carbonate (soda ash). If the bisulphate is used, a slight excess of sodium carbonate should be added thereto in order to precipitate completely the iron which is almost invariably present as an impurity therein. For example, the production of 1000 parts of precipitated barium sulphate may be carried out as follows.

1050 parts by weight of crystalline barium chloride are dissolved in 2345 parts of soft water at 35 to 40° C., forming an approximately saturated solution, and the solution strained and brought to a temperature of about 33° C. 515 parts of sodium bisulphate are dissolved in a separate vessel in 1715 parts of soft water, and 227 parts of soda ash are slowly added to the solution. When the addition is complete, the sulphate solution should be faintly alkaline. The iron hydroxide and iron carbonates are filtered out and the liquid likewise brought to a temperature of about 33° C. This represents a solution containing approximately the maximum possible concentration of sodium sulphate. The clear sulphate solution is then added slowly to the barium chloride solution with violent agitation. For example, the barium chloride solution may be agitated by a high speed screw propeller agitator, the sodium sulphate solution being introduced in a slow stream close to the axis of the propellor. The two solutions coming into contact one with the other form a barium sulphate gel, which is immediately broken by the agitator, the motion of which causes the simultaneous crystallization of numerous very fine particles of barium sulphate, preventing the slow growth of large crystals. If a distinct excess of the sulphate is not employed, the solution should be tested for the presence of barium ions, and more sulphate added if necessary. The complete eliminatiton of barium ions from the solution is important, since otherwise the soap added later would immediately be precipitated as the insoluble barium soap. Although a satisfactory product may be obtained by adding the barium chloride to the sulphate, it has been found that a somewhat finer precipitate may be obtained by adding the sulphate to the barium chloride as described above.

The suspension of barium sulphate thus produced contains large quantities of sodium chloride which is formed simultaneously with the barium sulphate by the double decomposition of the barium chloride and sodium sulphate. The soluble salt cannot conveniently be separated from the barium sulphate by the ordinary methods of filtration and washing, since the particles are so fine that they pass through filter papers or filter plates; nor by sedimentation and decantation, since the rate of sedimentation is extremely low. The particles of barium sulphate are therefore flocculated by the addition of a small proportion of a soap. It is probable that the fine crystals formed by adding a sulphate to a solution of a barium salt are positively charged, perhaps because of the occlusion or adsorption of barium ions on the crystals. The addition of an alkaline soap solution probably neutralizes the positive charges, allowing individual particles to come in contact with one another and flocculate. The first apparent effect of the flocculation or coalescence of the fine particles is a very marked increase in viscosity, or thickening of the suspension. The important result, however, is that the flocs may be filtered without the slightest difficulty, or if washing by decantation is preferred, settle rapidly, leaving an absolutely clear supernatant fluid. The soap employed may be any soluble soap, such as sodium or potassium oleate, stearate, or palmitate, or a mixture of such soaps, but an ammonium soap such as ammonium oleate is preferred, since the alkalinity is more readily controlled than if a soap of a fixed metal is employed. As little as 0.4% of ammonium oleate, based on the dry weight of the barium sulphate, has been found to flocculate it satisfactorily, but larger proportions give somewhat better results. More than about 2% of this soap should not be employed, however, since such large proportions again peptise and redisperse the flocculated particles. However, if such larger proportions of soap are desired in the finished product, they may conveniently be added after the final washing, just before the pigment is dried. The exact amount of soap which should be employed depends on the character and particle size of the pigment, on the temperature of the liquid, and on the properties of the particular soap employed. It must therefore be determined by experiment in each particular case, how much soap is necessary to flocculate the pigment without peptising and redispersing it.

The precipitate prepared as described above is diluted with about 20,000 parts of soft water, and 4 parts of ammonium oleate dissolved in a small quantity of water are mixed with the liquid. In a short time the barium sulphate settles to the bottom of the container, leaving the major portion of the solution clear and free from solid matter. The clear solution is decanted off, the precipitate rediluted, etc. until the solution is substantially free from soluble salts.

The final step in the preparation of the pigment is the drying operation. In some cases spray drying of the concentrated slurry resulting from the last decantation may be economical, but filtration, and drying of the cake will usually be preferred because of the more complete removal of the last traces of soluble salt. The drying may be carried out in any of the standard types of oven driers, tunnel driers, rotary driers, etc., preferably at a temperature slightly above the boiling point of water, say 110° C. The product prepared in the manner described in detail above has an average particle size of less than 0.2 microns, the particles being remarkably uniform and regular in shape. The dried product shows a slight tendency to cake and stick together in lumps, like very fine flour or corn starch, but the lumps are very readily broken and may be rubbed to an absolutely impalpable powder by a slight pressure. The small amount of soap which has been added is apparently enough to surround each particle completely with a protecting layer which, while promoting the flocculation of the particles in aqueous media, also promotes the dispersion of the pigment in media in which the soap is soluble. It has been found that if less than about 0.4% of ammonium oleate is added, the pigment tends to dry to a hard cake which is not readily dispersable. Larger proportions may be used if the presence of the soap in the product is not objectionable. A large proportion of soap will be found particularly useful in case it is intended later to redisperse the dry pigment in water.

For example, the dried pigment may readily be redispersed in water by simply adding to the water sufficient additional soap to peptise the flocculated pigment. If ammonium oleate is employed, the addition of a quantity which will bring the total amount up to about 4% of the weight of the barium sulphate will be found sufficient. The pigment is peptised and deflocculated by vigorous agitation, either directly in the container, or by passage through a colloid mill. The dispersion is exceedingly fine and very permanent, and the concentration of barium sulphate in the liquid may be brought as high as 75% by weight.

The pigment is likewise readily and completely dispersable in hydrocarbons such as rubber and oil, but no additional soap need be added in these cases. The fine barium sulphate prepared by the hereinabove described method is a much better pigment for paints, varnishes, lacquers, etc. than ordinary blanc fixe, makes a smoother paint, and may be used in larger proportions. Since the particles are exceedingly fine, the pigment does not settle to a hard cake in the bottom of the container.

Because of its exceeding fineness, the precipitated barium sulphate prepared by the method of this invention is an excellent reenforcing pigment for rubber compositions, replacing carbon black and the more expensive zinc oxide, which have heretofore been the only available pigments fine enough to give the desired effect. Rubber compositions comprising the fine barium sulphate pigment have approximately the same physical properties as similar compositions containing an equivalent amount of zinc oxide, but are considerably less expensive, lighter in weight, and more resistant to corrosive agents such as strong acids and alkalis.

The following tests illustrate the superiority of the precipitated barium sulphate of this invention over ordinary blanc fixe. Two rubber compositions were prepared, each containing 100 parts by weight of rubber, 1 part of a softener, 3.5 parts of zinc oxide, 4.5 parts of sulphur, and 0.2 parts of an accelerator. One of them, Composition A, contained in addition 73 parts of ordinary blanc fixe, while the other, Composition B, contained the same amount of precipitated barium sulphate prepared by the method of this invention. This amount of barium sulphate corresponds to about 13% by volume of the composition, or about 15½% by volume of the rubber alone. The two compositions were vulcanized in a press under identical conditions, for 4, 5 and 6 minutes at 143° C. (290° F.), 5 minutes being the normal time of vulcanization. T in the following table indicates ultimate tensile strength in pounds per square inch, M represents the modulus or tensile stress at 500% elongation, and E represents the ultimate elongation in percent of original length.

*Tensile properties of rubber containing barium sulphate*

| Time of vulcanization | Composition A | | | Composition B | | |
|---|---|---|---|---|---|---|
| | T | M | E | T | M | E |
| 4 minutes at 143° C | 1540 | 540 | 780 | 2440 | 660 | 775 |
| 5 minutes at 143° C | 2660 | 1140 | 690 | 3440 | 1000 | 760 |
| 6 minutes at 143° C | 3470 | 1700 | 680 | 3980 | 1380 | 720 |

It is evident that the product prepared by the method of this invention produces softer rubber with a much higher tensile strength and elongation. A microscopic examination of Composition B shows that the pigment is very fine, of uniform particle size and uniformly dispersed, aggregates and agglomerates being noticeably absent.

In another experiment, barium sulphate prepared by the method of this invention was substituted weight for weight for a major portion of the zinc oxide in a solid tire composition containing a very high proportion of zinc oxide. Although the composition containing the barium sulphate contained a larger total volume of pigment, barium sulphate being considerably lighter than zinc oxide, the tensile properties of the two compositions were almost identical. The barium sulphate is capable of replacing zinc oxide in practically any rubber composition, without appreciably changing the tensile properties or durability of the rubber. However, in compositions containing accelerators which require zinc oxide for activation, a small amount of zinc oxide should be retained for that purpose.

The practice of this invention has been described with reference to barium sulphate, but it is obvious that other pigments may be prepared by the same method, and employed in a like manner, the necessary changes in the individual steps being obvious to those skilled in the art. The following pigments, for example, have been precipitated in very finely divided form and flocculated with soap: lithopone, calcium carbonate, lead chromate. The washed and dried precipitate containing the soap is very readily and completely dispersable in water, oils, rubber, etc. It has even been found that pigments which were not originally dried in the presence of soap, and which cake badly during incorporation into such materials as rubber, may be greatly improved by suspending them in water and adding a small proportion of soap, filtering, and drying. Samples of commercial zinc oxide, blanc fixe, and whiting, thus treated with soap, have been found to be much more readily incorporated into rubber than the same untreated pigments, and to produce more homogeneous and therefore stronger and more durable rubber compositions.

The invention is susceptible of numerous other modifications, some of which have been indicated. It is to be understood, however, that it is not intended to limit the invention to the specific embodiments herein described, nor to limit it by any theories which have been advanced in explanation of the results obtained, but to limit it only as may be required by the prior art, and as indicated in the appended claims.

It is also to be understood that the term "barium sulphate", as employed in the claims, unless otherwise limited, is used in a generic sense to include not only pure barium sulphate, but also mixed pigments consisting largely of barium sulphate, such as the lithopones.

I claim:

1. The method of preparing a finely divided pigment which comprises precipitating the pigment from aqueous solution, adding a water soluble soap to the precipitated pigment while it is still wet, and drying the pigment.

2. The method of preparing a finely divided pigment which comprises precipitating the pigment from aqueous solution, washing it substantially free from soluble salts, adding an aqueous solution of a soluble soap to the precipitated pigment while it is still wet, and drying the pigment.

3. The method of preparing finely divided barium sulphate which comprises precipitating barium sulphate from an aqueous solution, adding a water soluble soap to the precipitated barium sulphate while it is still wet, and drying the barium sulphate.

4. The method of preparing finely divided barium sulphate which comprises precipitating barium sulphate from an aqueous solution, washing it substantially free of soluble salts, adding an aqueous solution of a soluble soap to the precipitated barium sulphate while it is still wet, and drying the barium sulphate.

5. The method of preparing finely divided barium sulphate which comprises precipitating barium sulphate from an aqueous solution, adding a small proportion of a water soluble soap to flocculate the precipitated barium sulphate, and washing and drying it.

6. The method of preparing finely divided barium sulphate which comprises admixing, with vigorous agitation, concentrated aqueous solutions of a barium salt and a sulphate, washing the precipitated barium sulphate substantially free from soluble salts, adding an aqueous solution of a soluble soap to the precipitated barium sulphate while it is still wet, and drying it.

7. The method of preparing finely divided barium sulphate which comprises admixing, with vigorous agitation, concentrated aqueous solutions of barium chloride and the sulphate of an alkali metal or ammonium, adding a small proportion of a water soluble soap to flocculate the precipitated barium sulphate, washing it and drying it.

8. The method of preparing finely divided barium sulphate which comprises admixing, with vigorous agitation, a slight excess of a concentrated solution of sodium sulphate with a concentrated solution of barium chloride, adding a small proportion of an ammonium soap to flocculate the precipitated barium sulphate, washing it and drying it.

9. The method of preparing finely divided barium sulphate which comprises admixing, with vigorous agitation, a slight excess of a concentrated solution of sodium sulphate with a concentrated solution of barium chloride, adding from 0.4 to 2.0% of an ammonium soap (based on the weight of the barium sulphate) to flocculate the precipitated barium sulphate, washing it substantially free from soluble salts and drying it.

10. A finely divided precipitated barium sulphate, consisting of individual precipitated crystals of barium sulphate coated with a film of a soluble soap.

11. A finely divided precipitated barium sulphate, substantially free from soluble salts, consisting of individual precipitated crystals of barium sulphate coated with a film of a soluble soap.

12. A finely divided precipitated barium sulphate, substantially free from soluble salts, consisting of individual precipitated crystals of barium sulphate coated with from 0.4 to 2.0% of an ammonium soap.

13. A finely divided barium sulphate prepared by admixing a slight excess of a concentrated solution of sodium sulphate with a concentrated solution of barium chloride, adding a small proportion of an ammonium soap to flocculate the precipitated barium sulphate, washing it and drying it.

14. The method of preparing a finely divided pigment which comprises precipitating the pigment from aqueous solution, adding a small proportion of a water soluble soap to flocculate the fine precipitate, washing the precipitated particles, and drying them.

15. The method of preparing a finely divided pigment which comprises precipitating the pigment from aqueous solution, adding a small proportion of an ammonium soap to flocculate the fine precipitate, washing the precipitated particles substantially free of soluble salts, and drying them.

16. In the preparation of precipitated pigments the step of adding a small proportion of a water soluble soap to the freshly precipitated aqueous pigment suspension to flocculate the pigment.

17. In the preparation of precipitated pigments, the step of adding from 0.4 to 2% (based on the weight of the pigment) of ammonium oleate to the freshly precipitated aqueous pigment suspension to flocculate the pigment.

18. In the preparation of precipitated pigments, the steps of adding a small proportion of a water soluble soap to the freshly precipitated aqueous pigment suspension to flocculate the pigment, and washing the flocculated pigment substantially free from soluble salts.

19. In the preparation of precipitated barium sulphate, the step of adding a small proportion of a water soluble soap to the freshly precipitated aqueous barium sulphate suspension to flocculate the barium sulphate.

20. In the preparation of precipitated barium sulphate, the steps of adding a small proportion of an ammonium soap to the freshly precipitated aqueous barium sulphate suspension to flocculate the barium sulphate, and washing the flocculated barium sulphate substantially free from soluble salts.

HERBERT A. ENDRES.